United States Patent [19]

Yamamoto

[11] Patent Number: 5,261,008
[45] Date of Patent: Nov. 9, 1993

[54] FINGERPRINT VERIFICATION METHOD
[75] Inventor: Makoto Yamamoto, Tokyo, Japan
[73] Assignee: Yozan, Inc., Tokyo, Japan
[21] Appl. No.: 18,215
[22] Filed: Feb. 16, 1993

Related U.S. Application Data

[62] Division of Ser. No. 740,603, Aug. 5, 1991.

[30] Foreign Application Priority Data

Aug. 7, 1990 [JP] Japan ................. 2-209052
Aug. 7, 1990 [JP] Japan ................. 2-209053

[51] Int. Cl.⁵ ............................................. G06K 9/00
[52] U.S. Cl. ........................................ 382/4; 382/30; 382/42; 382/48
[58] Field of Search ............. 382/4, 5, 30, 34, 42, 382/48, 25; 356/71

[56] References Cited

U.S. PATENT DOCUMENTS

| | | | |
|---|---|---|---|
| 4,151,512 | 4/1979 | Riganuti et al. | 382/4 |
| 4,581,760 | 4/1986 | Schuller et al. | 382/4 |
| 4,641,350 | 2/1987 | Bunn | 382/4 |
| 4,723,298 | 2/1988 | Schuller | 382/4 |
| 4,827,527 | 5/1989 | Morita et al. | 382/4 |
| 4,872,203 | 10/1989 | Asai et al. | 382/4 |
| 5,040,224 | 8/1991 | Hara | 382/4 |
| 5,054,089 | 10/1991 | Uchida et al. | 382/4 |
| 5,073,949 | 12/1991 | Takeda et al. | 382/4 |
| 5,105,467 | 4/1992 | Kim et al. | 382/4 |

FOREIGN PATENT DOCUMENTS

| | | |
|---|---|---|
| 173972 | 3/1986 | European Pat. Off. . |
| 294716 | 12/1988 | European Pat. Off. . |
| 61-100 | 1/1986 | Japan . |
| 61-101 | 1/1986 | Japan . |
| 61-28171 | 2/1986 | Japan . |
| 61-145686 | 7/1986 | Japan . |
| 62-266686 | 11/1987 | Japan . |
| 8706378 | 10/1987 | PCT Int'l Appl. . |
| 8903099 | 4/1989 | PCT Int'l Appl. . |

OTHER PUBLICATIONS

Systems Computer Controls, vol. 13, No. 5, Sep. 1982, pp. 81-89.
Patent Abstract of Japan, vol. 13, No. 269, (p. 888), Jun. 21, 1989.
Patent Abstracts of Japan, vol. 11, No. 291, (p. 618) Sep. 19, 1987.
Patent Abstracts of Japan, vol. 1, No. 151 (M-050) Dec. 6, 1977.
Asai, et al., "Automated Fingerprint Indentification by Minutia-Network Feature-Feature Extraction Process", The Translations . . . Electronics, Information . . . Engineers, vol. J72-D-II, No. 5, pp. 724-732, May 1989.
"Algorithm of Fingerprint Verification System", Nikkei Electronics, Jan. 1989 (No. 464).
Matsuura, et al., "A Method for Fingerpring Image Enhancement Using the Ridge Direction", The Transactions of The Institute of Electronics, Information and Communication Engineers, vol. J72-D-II, No. 2, pp. 302-306, Feb. 1989.
Sasakawa, et al., "Personal Verification System with High Tolerance of Poor Quality Fingerprints", The Transactions of the Institute of Electronics, Information and Communication Engineers, vol. J72-D-II, No. 5, pp. 707-714, May 1989.
Hoshino, et al., "Automated Fingerprint Identification by Minutianetwork Feature-Matching Processes-", The Transactions of the Institute of Electronics, Information and Communication Engineers, vol. J72-D-II, No. 5, pp. 733-740, May 1989.

Primary Examiner—Joseph Mancuso
Attorney, Agent, or Firm—Cushman, Darby & Cushman

[57] ABSTRACT

A method for verifying that a sample image of a fingerprint is that of a designated person through comparison of sample data, generated from the sample image, with master data, generated from a master image of the designated person's fingerprint. The master and sample image have been divided into a plurality of blocks, and each block has been divided into a plurality of block areas. Each block area has a number of pixels each having an associated direction as the sample and master data. The direction associated with each pixel was determined based on pixel density partial differentials between the pixel and adjacent pixels for a plurality of directions. The direction of the minimum pixel density partial differential for a pixel is chosen as the direction for that pixel. Based on the sample and master data fingerprint verification is determined by at least one of total dispersion, cross-correlation, and distance between classes.

3 Claims, 8 Drawing Sheets

FINGERPRINT VERIFICATION METHOD

This is a division of application Ser. No. 07/740,603, filed Aug. 5, 1991.

BACKGROUND OF THE INVENTION

1. Field of the Invention

The present invention relates to a fingerprint verification method which compares a fingerprint to be examined with a stored reference fingerprint, and finds application, for example, as a security system which opens a door only for registered persons.

2. Description of the Related Art

According to the conventional fingerprint verification method for a security system, an image including the protuberant lines of a fingerprint is binarized and thinned so as to calculate a protuberant line pattern. Then branch points, end points and curvature are extracted from the above protuberant line pattern as the main characteristics of the fingerprint. Based on those characteristics, a comparison is performed between a master image (image of a reference fingerprint) and a sample image (image of a finger-print to be examined). Since the characteristics appear all over the fingerprint, it was preferable for the conventional fingerprint verification method to have a fingerprint which covered a wide area. Therefore, the image of the fingerprint had to be taken by rotating the finger which included not only the front part of the finger but also the sides of the finger.

The protuberant lines at the lower portion of the fingerprint, i.e., a joint part of a finger, are usually arranged in a horizontal direction; therefore, there are few characteristics. Furthermore, the image at the lower portion of the fingerprint is usually input incorrectly; therefore, it is ineffective data for fingerprint verification. Accordingly, when using such an image for fingerprint verification, accurate verification will be difficult to perform due to the vast volume of noise in the data. Also, when using data representing the lower part of the fingerprint, the volume of input data becomes so large that it becomes necessary to expand memory capacity.

Furthermore, when a whole fingerprint is used for fingerprint verification, it is difficult to impress the fingerprint to be examined; therefore, the time required for fingerprint verification is long.

SUMMARY OF THE INVENTION

The object of the present invention is to solve the above problem and to provide a fingerprint verification method that realizes accurate fingerprint verification using a small volume of data.

The present invention has as a further objective providing a fingerprint verification method that greatly simplifies the steps of generating master image and sample image data for use in fingerprint verification; as well as, realizing accurate fingerprint verification within a short period of time.

The objectives of the present invention are achieved by a method for generating sample and master data for fingerprint verification and a fingerprint verification based on the generated data.

A method for generating sample and master data for fingerprint verification, according to the present invention, includes the steps of inputting, as one of a master image and a sample image, a gray scale image of a finger, including a tip of the finger, the gray scale image composed of pixels; determining a center of characteristics of the gray scale image; taking as an area of examination that part of the gray scale image from the center of characteristics to the tip of the finger; calculating density partial differentials in a plurality of directions for each pixel in the area of examination; and, determining, as the one of the master data and the sample data, a direction of a minimum density partial differential for each pixel in the area of examination.

Alternatively, the area of examination can be taken as an area having the center of characteristics as its center, or an area having the center of characteristics as its center and including the fillet center.

After the determination of the master and sample image data, fingerprint verification can be performed. Fingerprint verification based on the master and image data generated is performed by at least one of total dispersion, cross-correlation, and distance between classes.

The fingerprint verification method of total dispersion includes the steps of determining a dispersion within a class of each block of the sample image based on the sample data which represents a direction of a finger characteristic within a block; determining a dispersion within a class of each block of the master image based on the master data which represents a direction of a finger characteristic within a block; determining the aberration of direction between blocks of the sample image and master image representing a difference in a finger characteristic between respective blocks of the sample image and master image based on the sample data and master data; determining a total dispersion based on the dispersion within a class for each block of the sample image and the master image and the aberration of direction which represents a measure of the similarity between the sample image and the master image; comparing the total dispersion for each block to a reference total dispersion; and, verifying a fingerprint as that of the designated person based on results from the comparisons.

The fingerprint verification method of cross-correlation includes the steps of determining a cross-correlation between the block areas of each block in the sample image and the master image based on a number of pixels in each block area of the sample image and master image associated with a direction which represents a similarity in directions associated with the pixels in a block area; calculating a mean of the cross-correlations between the block areas for each block of the sample and master image to determine a cross-correlation between each block of the sample and master image; comparing the cross-correlations between each block of the sample and master image to a reference cross-correlation; and, verifying a fingerprint as that of the designated person based on results from the comparisons.

The fingerprint verification method of dispersion between classes includes the steps of determining a distance between classes between the block areas of each block in the sample image and the master image based on a number of pixels in each block area of the sample image and master image associated with a direction which represents a difference in directions associated with the pixels in a block area; calculating a mean of the distance between classes between the block areas for each block of the sample and master data to determine a distance between classes between each block of the sample and master data; comparing the distance between classes between each block of the sample and master data to a reference distance between classes; and, verifyinq a fingerprint as that of the designated person based on results from the comparisons.

Alternatively, any combination of the above methods of fingerprint verification can also be used.

BRIEF DESCRIPTION OF THE DRAWINGS

FIG. 10 shows a diagram defining the direction codes; an

DETAILED DESCRIPTION OF THE PREFERRED EMBODIMENTS

Hereinafter, the first embodiment of the present invention is described with reference to the attached drawings.

Figure 2:
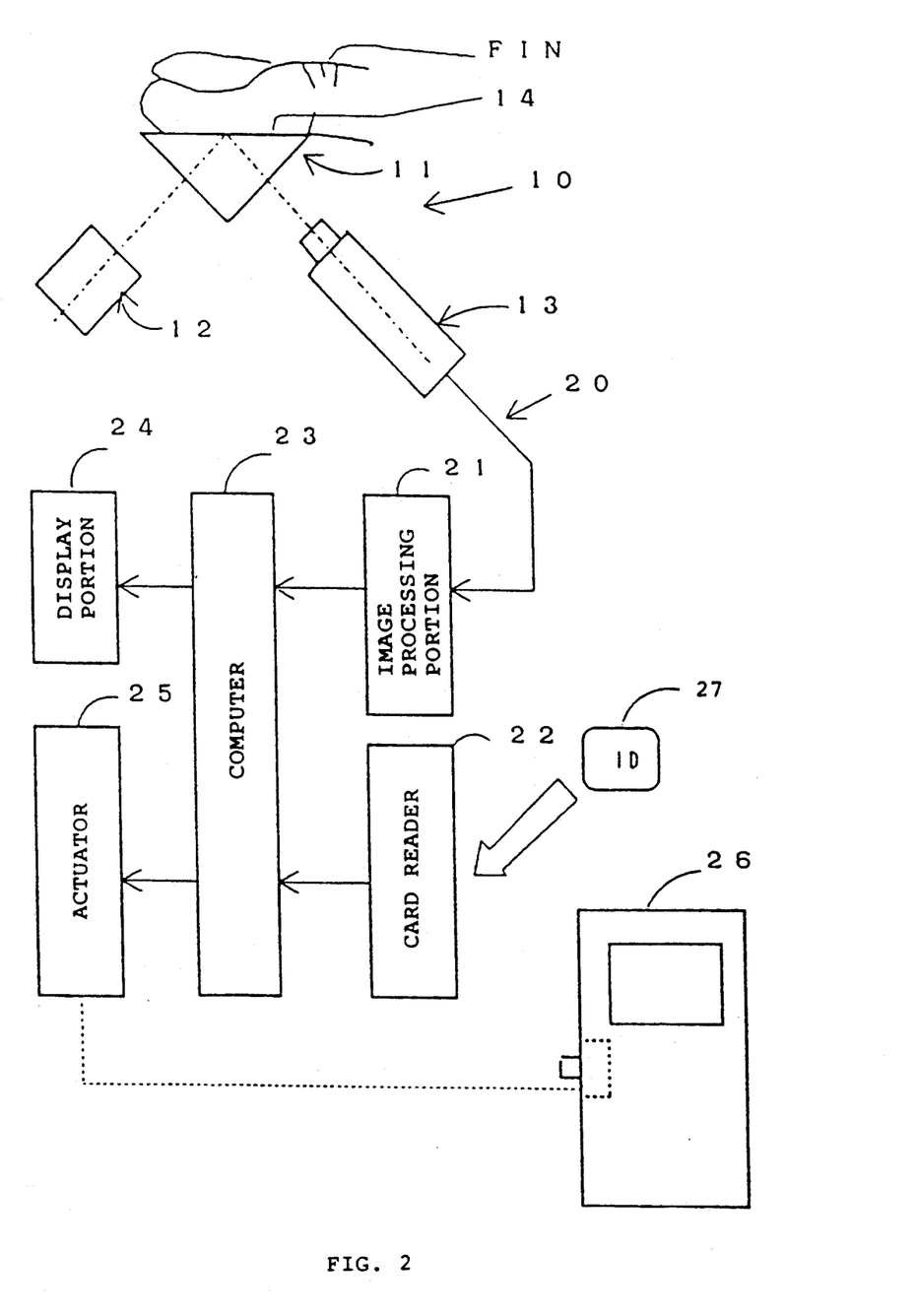
FIG. 2 shows a block diagram of a fingerprint verification system.

FIG. 2 shows a fingerprint verification system applying an image comparison method of the present invention. The fingerprint verification system consists of an image input system 10 and a verification processing system 20. Comparison processing is performed on the image photographed by the image input system 10 by the verification processing system 20. In the image input system 10, the total reflection of illumination incident upon a right-angle prism 11 from a luminous source 12 is detected by a CCD camera 13. A slanting surface 14 of the prism 11 is deemed the detection surface, where a finger FIN having a fingerprint to be detected is contacted thereon. Without contact with the finger FIN, the whole of the illumination is totally reflected, and the image detected by the CCD camera 13 is all in white.

Figure 3:
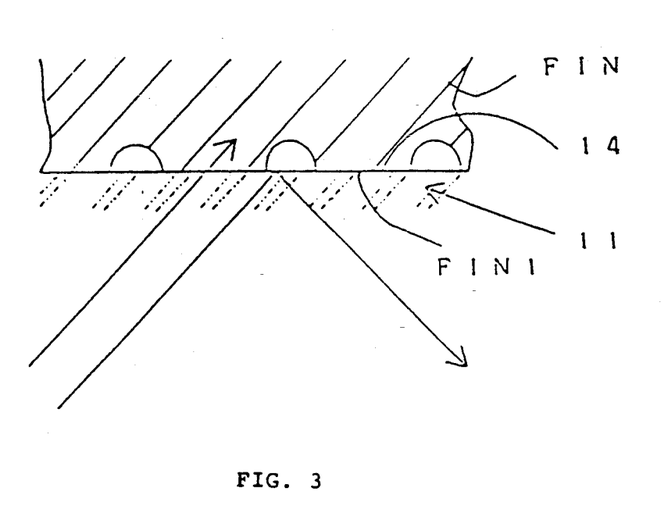
FIG. 3 shows an enlarged diagram of the slanting surface of the right-angle prism in contact with the finger.

As shown in FIG. 3, the illumination at the protruded portions FIN 1 does not totally reflect; and, thus, passes through the interface of the prism because the angle of refraction at the interface of the prism changes. Therefore, the protruded portions of the fingerprint are input to the CCD camera 13 as dark lines with gray levels.

The verification processing system 20 comprises an image processing portion 21 and a card reader 22. Master data is read when the person being examined inserts an ID card 27 into the card reader 22. Then the comparison of the data input from the image input system 10 with the master data is performed by a computer 23. The comparison results are displayed at a display portion 24. When the comparison results come up to standard (coincidence of the fingerprints), an actuator 25 is operated and a door 26 is opened.

Various manners of specifying the master data are acceptable, such as inputting from a keyboard the ID number of a person being examined.

Figure 4:
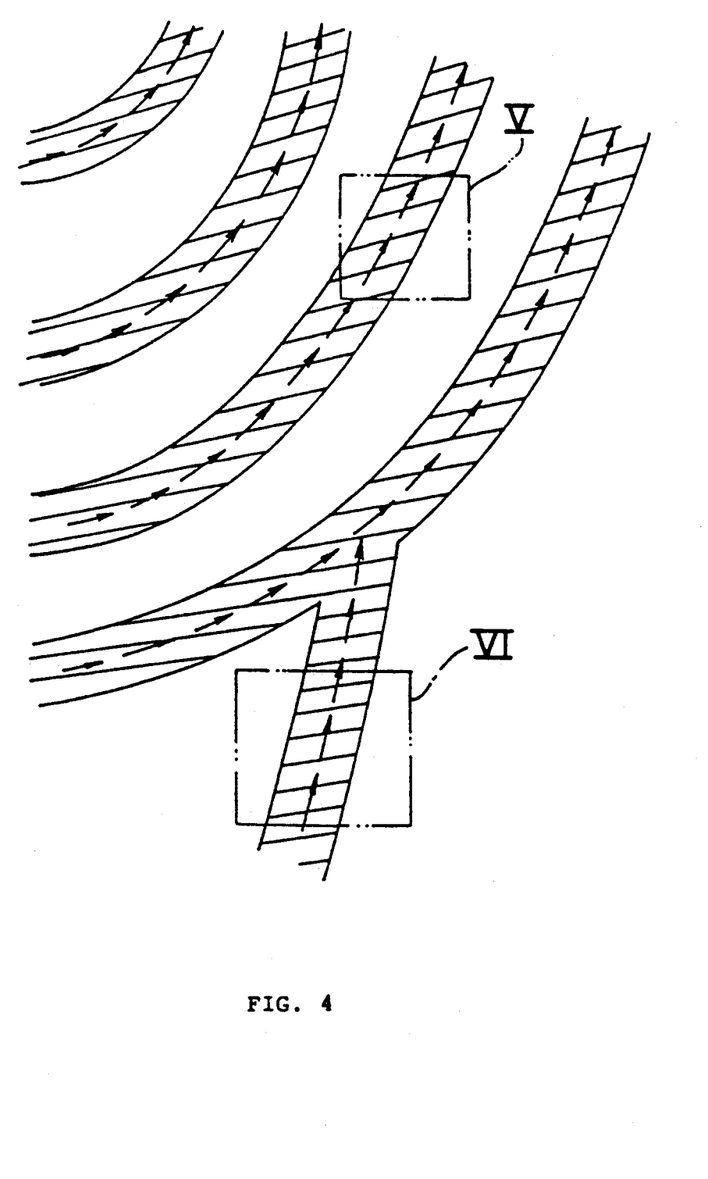
FIG. 4 shows an example of a protuberant pattern for a fingerprint.
Figure 5:
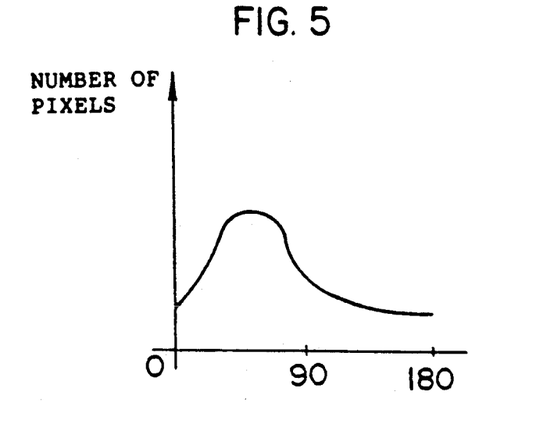
FIG. 5 shows a histogram with respect to the change in density value of the pixels in area "V" in FIG. 4.
Figure 6:
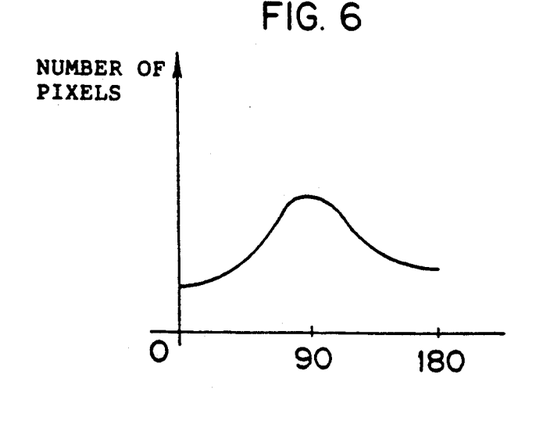
FIG. 6 shows a histogram with respect to the change in density value of the pixels in area "VI" in FIG. 4.

In FIG. 4, the arrows show the general directions of the protuberant lines of a fingerprint. For an index expressing those general directions, the inventors adapted a histogram of the direction for which a partial differential value of the density value for each pixel becomes minimum. For example, the partial differential value of the density value of each pixel in an area "V" has a frequency which becomes minimum in the direction of 45 degrees. This result is obtained because the change in the density value of each pixel in the area "V" has a strong tendency to become minimum in the direction rotated counterclockwise by 45 degrees from horizontal. Accordingly, a histogram, as shown in FIG. 5, can be obtained with respect to the change in density value of pixels in the area "v". The partial differential value of the density value of each pixel in an area "VI" has a frequency which becomes minimum in the direction of 90 degrees. This result is obtained because the change in density value of each pixel in the area "VI" has a strong tendency to become minimum in the direction rotated counterclockwise by 90 degrees from the horizontal. Accordingly, a histogram, as shown in FIG. 6, can be obtained with respect to the change in density value of pixels in the area "VI".

In order to obtain a histogram as described above, the following processing is performed.

The density value of each pixel in an input fingerprint image is calculated, i.e., a sample image. Meanwhile, the density values for each pixel of the reference fingerprint image, i.e., a master image, are calculated and stored in the memory of the computer 23.

Figure 7:
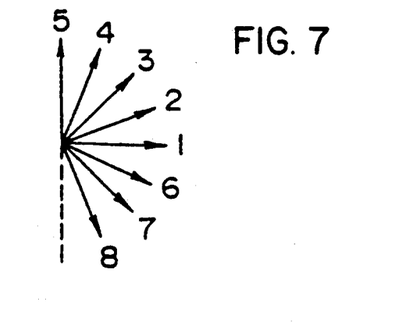
FIG. 7 shows a diagram indicating the direction of the partial differential.

Then partial differentiation is performed according to the density value of each pixel among the neighborhood pixels. Here, the neighborhood pixels are not only pixels directly adjacent to an objective pixel on which partial differential is performed, but also pixels distant by a few pixels from the objective pixel. As shown in FIG. 7, partial differentiation is performed over a range of 157.5 degrees, in the horizontal direction (number 1), in the directions rotated by 22.5 degrees in counterclockwise direction from the horizontal direction (numbers 2, 3, 4, and 5), and in the directions rotated by 22.5 degrees in clockwise direction from the horizontal direction (numbers 6, 7 and 8). When x and y coordinates are determined in the horizontal and vertical directions, respectively, and the change in value of the density values are deemed $\Delta$ d the partial differential value z can be expressed by:

$$z = \frac{\Delta d}{\Delta x + \Delta y}$$

The partial differential with respect to a digital image is discrete. Especially for the distance elements, it is necessary to differentiate comparatively long distances depending on the direction of the partial differentiation. However, when the distance is too long, differentiation is performed only on the mountains of a fingerprint. As a result, the characteristics of the protuberant lines of the fingerprint are lost. Therefore, a minimum distance value should be used to heighten the precision in a particular direction. According to the image processing system 10 in FIG. 2, corrections with respect to the elements in the Y direction are required for an image input to the CCD camera 13 for the examination of the fingerprint from 45 degrees slantwise. The following effective results were obtained by using the following distances for partial differentiation concerning the above correction;

0° ($\Delta x=2$, $\Delta y=0$), 22.5° ($\Delta x=2$, $\Delta y=1$), 45° ($\Delta x=2$, $\Delta y=2$), 67.5° ($\Delta x=2$, $\Delta y=3$).

When the partial differential values for each pixel are calculated in each direction of numbers from 1 to 8 (FIG. 7), a smaller partial differential value is stored in a memory by comparing the previously calculated partial differential value and the newly calculated partial differential value. By storing in memory the smaller of the partial differential value as between each direction, the minimum partial differential value is stored in the memory by the time all calculations with respect to the directions of numbers 1-8 are complete. By repeating the above processing for all pixels, the minimum partial differential value for all pixels are calculated.

The partial differentials are performed again in each direction of numbers from 1 to 8 for each pixel, so as to compare those differential values with the previously calculated minimum partial differential value. The number (out of numbers from to 8 with respect to FIG. 7), corresponding to the direction of the newly calculated differential value which coincides with the minimum partial differential value, is stored in the memory of the image processing portion. Accordingly, the directions of the minimum partial differential values are calculated for all pixels, and the distributions of the directions of the minimum partial differential values for a whole image can be obtained. Since the direction elements of each area in the image are extracted directly from the gray level image, it is possible to make efficient use of the information of an original image.

Once the distribution of the directions of the minimum partial differential values for the sample image is obtained, grasping of the tendency of the protuberant lines of the fingerprint is possible. Therefore, fingerprint verification becomes possible by comparing the distribution with respect to the above direction with that of the master image. That is, data of the direction of the minimum partial differential value for each pixel in the sample image is compared with that of the corresponding pixel in the master image.

However, according to the present embodiment as described later, an image is separated into a plurality of blocks. An index is calculated based on the direction where the partial differential becomes the minimum according to the portion of a block above the center of the characteristics of the fingerprint image, so as to perform the comparison between the sample image and the master image. This is effective since many characteristics of the fingerprint appear at the portion of a block above the center of the characteristics.

Before the comparison is performed between the sample image and the master image, justification of positions for those images is performed. This justification of positions is explained with referring to FIG. 8.

Figure 8:
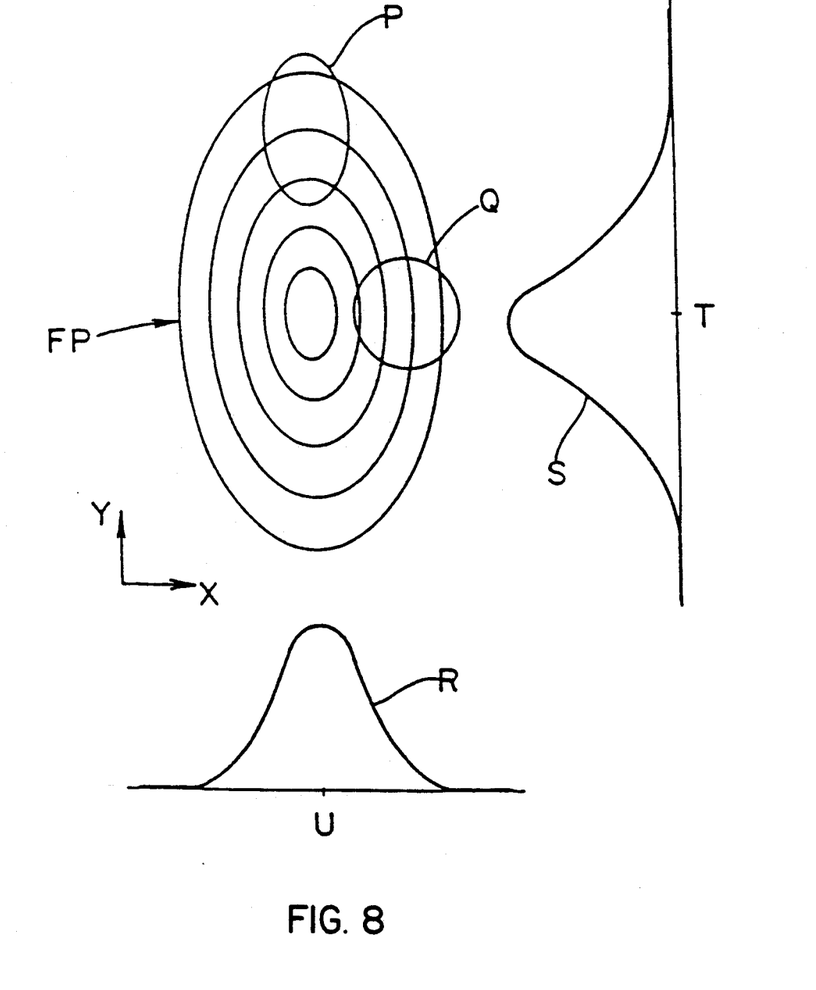
FIG. 8 shows a diagram for explaining the calculation method of the center point of an image.

In FIG. 8, the protuberant lines FP of the fingerprint are arranged to make the spiral figure, so the pixels with the same density value are arranged along this spiral. Here, the horizontal and vertical directions are deemed the X and Y directions, respectively. When the partial differential is taken of the density values between adjacent pixels along the Y direction, the calculated change ratio of the density value according to the Y direction becomes large at, for example, the area P where the protuberant lines lengthen in X direction, and becomes small at the area Q where the protuberant lines lengthen in Y direction. Therefore, a histogram with respect to the partial differential value of the density values in Y direction becomes a maximum at the center as indicated by the letter R. Equivalent to the above, the change ratio of the density values in the X direction becomes small at the area P where the protuberant lines are lengthened in X direction, and becomes large at the area Q where the protuberant lines are lengthened in Y direction. Therefore, a histogram with respect to the partial differential value of the density values in X direction becomes a maximum at the center as indicated by the letter S.

According to the present embodiment, the maximal point (letter T) of the histogram (letter S) with respect to the change of density values along X direction is deemed to be a Y coordinate of a center point of the image. Also, the maximal point (letter U) of the histogram (letter R) with respect to the change of density values along Y direction is deemed to be a X coordinate of a center point of the image. The obtained center point as above is not the center of the configuration; it is the center of the characteristics of the image (for example, the center of the spiral). Accordingly, the center point is determined as the center of the characteristics where the extreme value of the histogram of the density partial differential values occur.

Figure 1:
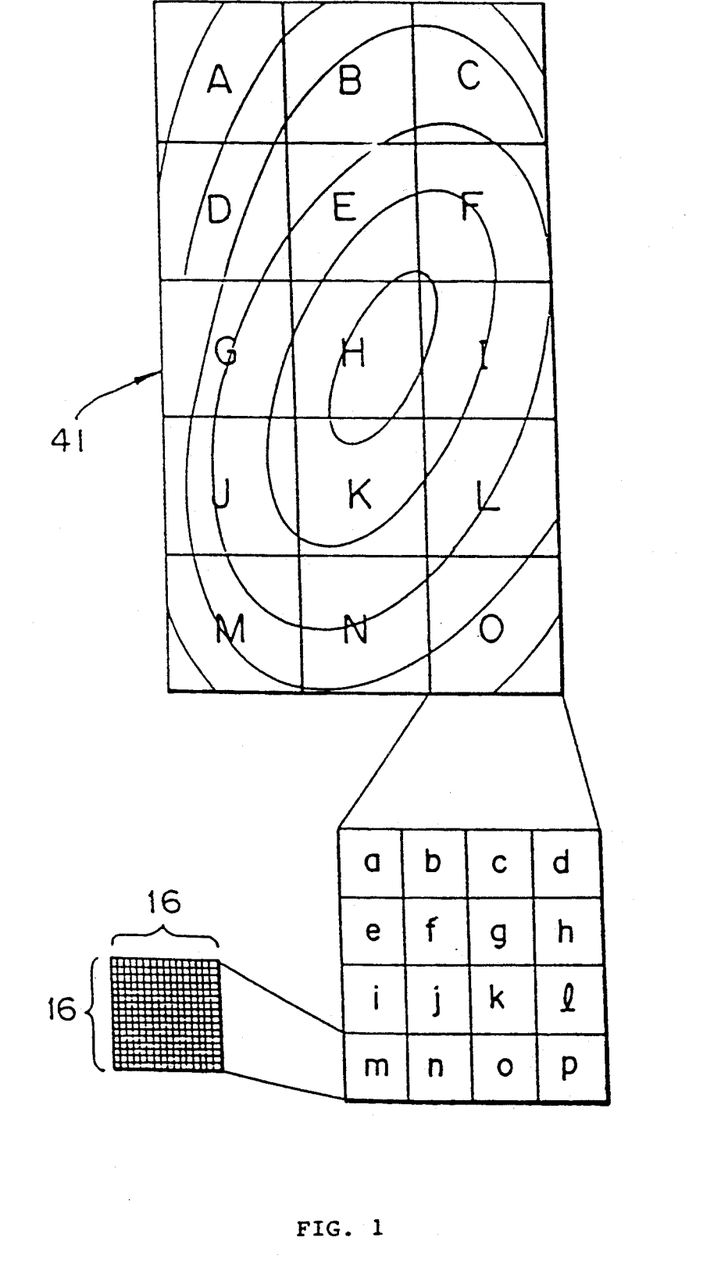
FIG. 1 shows a fingerprint divided into a plurality of blocks.

As it is shown in FIG. 1, both the master image and the sample image are divided into, for example, 15 blocks from A to O, respectively. The justification of positions between the sample image and the master image is performed, so that the blocks of both images which include the center of the characteristics obtained by the manner described above coincide each other.

Hereinafter, the comparison judgment between the sample image and the master image is described.

FIG. 1 shows the manner to divide a fingerprint image 41 into a plurality of blocks. This image 41 is divided into 15 blocks from A to O, each of which is further divided into 16 blocks from area a to p that comprise 16×16 pixels. According to the present embodiment, the comparison between the sample image and the master image is performed using the data with respect to the portion of blocks above the center of characteristics, blocks from A to I, out of blocks from A to O.

The total dispersion for each area from a to p of each of blocks from A to I is calculated. Fundamentally, the total dispersion is defined by the following formula:

$$\text{Total Dispersion} = \text{Dispersion Between Classes} + \text{Dispersion Within a Class}$$
$$= \sin^2(\theta/2) + (Vm + Vs)/2$$

where, $\theta$ indicates an aberration angle of the direction where the partial differential value of the master image and the sample image becomes minimum, $Vm$ indicates the dispersion within a class for each area of the master image, and $vs$ indicates the dispersion within a class for each area of the sample image. According to the embodiment, the total dispersion RE is defined by subtracting the total dispersion defined by the above formula from 1. That is, the total dispersion RE of the present embodiment is define by:

$$RE = 1 - \sin^2(\theta/2) - (Vm + Vs)/2 \qquad (1)$$
$$= \cos^2(\theta/2) - (Vm + Vs)/2$$

Accordingly, the following tendency is obtained, that the higher the identification ratio is the more the total dispersion increases.

Figure 9:
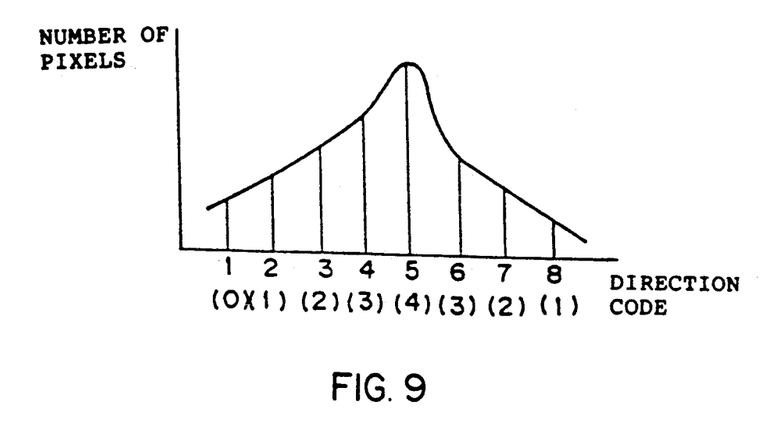
FIG. 9 shows a histogram with respect to the number of pixels in each direction code.
Figure 10:
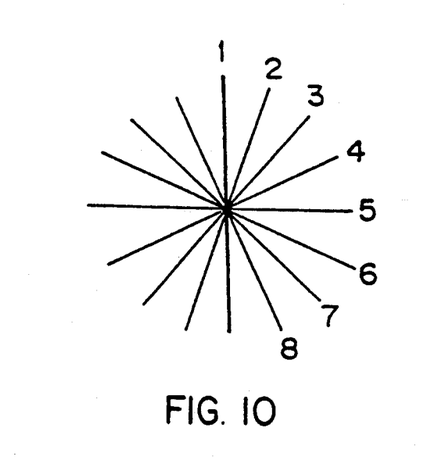

In order to obtain the total dispersion defined by the above formula (1), the dispersions within a class, Vm and Vs, with respect to the master image and the sample image are calculated beforehand. This is described with reference to FIG. 9 and FIG. 10. FIG. 9 shows a histogram with respect to the number of pixels for the direction codes. FIG. 10 shows the definition of the direction codes. That is, the direction toward the vertical direction is determined as a code "1". Based on this code, the number of codes are increased to "2", "3" ... "8" as the direction rotates in clockwise direction by 22.5 degrees.

First, the direction code "1" is deemed to be a center point, temporally. Then the aberrations of directions are calculated with respect to the above direction code "1" for each direction code. Accordingly, the aberrations of directions with respect to the direction codes "2", "3", "4", "5", "6", "7" and "8" are 1, 2, 3, 4, 3, 2, and 1 (numbers in the parentheses in FIG. 9), respectively. Here, the aberrations of directions with respect to the direction codes "2" and "8", "3" and "7", "4" and "6" are equivalent. This is because the aberration of direction does not consider whether it is in clockwise direction or in counterclockwise direction.

Next, the sum total T is calculated by multiplying the number of pixels for each direction code by a weight corresponding to the magnitude of its aberration of direction. Here, when the angle of aberration of direction is deemed to be $\theta$, weight is $\sin^2\theta$. When there is no aberration of direction, weight is 0.0. When the aberration of direction is 1, weight is 0.15. When the aberration of direction is 2, weight is 0.5. When the aberration of direction is 3, weight is 0.85. When the aberration of direction is 4, weight is 1.0. As above, the numbers of pixels for each direction code are multiplied by weights because it is considered that the farther the distance from the temporary center point becomes, the more the number of pixels for the dispersion within a class is influenced.

The value of the obtained sum total T divided by the number of pixels, 256, in the area is the dispersion within a class. This dispersion within a class is calculated by deeming every direction codes to be a temporary center point. Therefore, 8 directions within a class are calculated for each area. Then, the minimum value of those dispersions within a class is calculated so as to determine this minimum value as the dispersion within a class of that area. Also, the direction code which corresponds to the minimum value of dispersion within a class is deemed to be the direction code with respect to that area. Accordingly, the dispersions within a class and the direction codes are determined for each area from a to p.

The mean values of the dispersions within a class in each area from a to p are calculated for each of blocks from A to 1. The dispersions within a class obtained as above are dispersions within a class, Vm and Vs, of the master image the sample image used for the above formula (1). Equivalent to the above, the mean value of direction codes in each area from a to p is calculated so as to be determined as the direction code of the blocks from A to I. This direction code is a code used for the above formula (1), as it is described later.

Next, the aberration of direction according to the above formula (1), $\cos^2(\theta/2)$, is calculated. This calculation is performed by determining as angle "$\theta$" the angle that corresponds to the difference in direction codes between the master image and the sample image for blocks from A to I. For example, when the difference of direction codes between the master image and the sample image is 1, $\theta$ is 22.5 degrees, so that the aberration of direction is 0.96. Equivalent to the above, when the difference is 2, $\theta$ is 45 degrees so that the aberration of direction is 0.85. When the difference is 3, $\theta$ is 67.5 degrees so that the aberration of direction is 0.69. When the difference is 4, is 90 degrees so that the aberration of direction is 0.5.

The total dispersion RE with respect to the blocks from A to I is calculated from the above formula (1) by using the aberration of direction (dispersion between classes) obtained as above, and the dispersion within a class, Vm and Vs. This total dispersion RE changes between 0 and 1. The more identical the sample and the master images are, the more the value of the total dispersion approaches 1. For example, when the sample image and the master image are almost identical with one another, the value of total dispersion RE with respect to the blocks from A to I becomes more than 0.8. Contrary to the above, when the sample image and the master image are not identical, the value of the total dispersion RE with respect to the blocks from A to I becomes less than 0.7.

Next, the crosscorrelations are calculated with respect to the blocks from A to I.

$$COR = \frac{\sum_{i=1}^{8} x(\theta i) \times X(\theta i)}{\sqrt{\sum_{i=1}^{8} x^2(\theta i) \times \sum_{i=1}^{8} X^2(\theta i)}} \qquad (2)$$

where, COR is the crosscorrelation, $x(\theta i)$ is the number of pixels in $\theta i$(deg) direction with respect to the sample image, and $X(\theta i)$ is the number of pixels in $\theta i$(deg) with respect to the master image.

First the crosscorrelations, as with the total dispersion, are calculated for each area from a to p. Then mean values of the calculated crosscorrelations are determined as the crosscorrelation of corresponding blocks from A to I. The crosscorrelation changes between 0 and 1. The more identical the sample and the master images are, the more the value of the crosscorrelation approaches 1.

Then, the distances between classes are calculated with respect to the blocks from A to I. The distance between classes is defined as the following formula:

$$DG = \frac{\sum_{i=1}^{8} \{x(\theta i) - X(\theta i)\}^2}{\sum_{i=1}^{8} x(\theta i) \times \sum_{i=1}^{8} X(\theta i)} \qquad (3)$$

where, DG is the distance between classes, $x(\theta i)$ is the number of pixels in $\theta i$(deg) direction with respect to the sample image, and $X(\theta i)$ is the number of pixels in $\theta i$(deg) direction with respect to the master image.

First the distances between classes, as with the crosscorrelation, are calculated for each area from a to p.

Then mean values of the calculated distances between classes are determined as the distance between classes of corresponding blocks from A to I. The distance between classes changes between 0 and 1. The more identical the sample and the master images are, the more the value of the distance between classes approaches 0.

Accordingly, the total dispersions, the crosscorrelations and the distances between classes with respect to the upper blocks (blocks A to I) which include the center of characteristics are calculated with respect to both master and sample images. In order to judge whether or not the master image and the sample image with respect to the blocks from A to I coincide with one another, it is necessary to have a total dispersion of more than 0.7, a crosscorrelation of more than 0.96 and a distance between classes of less than 0.1.

When it is judged that the sample image and master image are different, the relative location between the sample image and the master image is changed in the horizontal direction by 1 area (from a to p of FIG. 1). Then the comparison between images is performed by the same manner as described above. When it is judged again that images are different, the relative location between the sample image and the master image is changed with respect to the original location in the opposite direction to the above by 1 area. Then the comparison between images is performed by the same manner as described above. When it is still judged that the sample image and the master image are different, even after the relative location of the images is changed in the horizontal direction, the relative location of images is change in vertical direction by 1 area from the original location to perform the comparison.

The comparison between the sample image and the master image is performed by justifying their centers of characteristics with one another. When those images are judged to be different, the comparison between images are continuously performed by changing the relative location between images by 1 area to the right and left, then up and down, successively, from the originally justified location. Accordingly, the comparison between images is performed at most 5 times by changing the relative location to the right and left, then up and down. When images are judged to be different 5 times, it is finally judged that the sample image and master image are different.

When the comparison method is applied to the fingerprint verification system shown in FIG. 2, the door 26 is opened when the fingerprint to be examined (the sample image) is judged to coincide with the reference fingerprint (the master image). When the fingerprint to be examined is judged not to coincide with the reference fingerprint, the door 26 will not be opened, and the system will request the person to be examined to input his fingerprint again, or it will output the message of "No Admittance".

Hereafter, the record embodiment is described. In this embodiment an image is separated into a plurality of blocks. An index is calculated based on the minimum direction according to the block including a center of the characteristics of the fingerprint image, so as to perform a comparison between the sample image and the master image. This is effective since many characteristics of the fingerprint appear around the neighborhood of the center of the characteristics.

The total dispersions for each area from a to p of the block H are calculated according to the formula (1).

The mean value of the dispersions within a class in each area from a to p is calculated. This mean value is determined as the dispersion within a class with respect to a block H. The dispersions within a class obtained as above are dispersions within a class, Vm and Vs, of the master image and the sample image used in the above formula (1). Equivalent to the above, the mean value of direction codes in each area from a to p is calculated to determine the direction code of the block H. This direction code is used for the above formula (1), as described later.

Next, the aberration of direction according to the above formula (1), $\cos^2(\theta/2)$, is calculated. This calculation is performed by determining the angle "$\theta$" that corresponds to the difference of direction codes between the master image and the sample image according to the block H. For example, when the difference of direction codes between the master image and the sample image is 1, $\theta$ is 22.5 degrees, so that the aberration of direction is 0.96. Equivalent to the above, when the difference is 2, $\theta$ is 45 degrees so that the aberration of direction is 0.85. When the difference is 3, $\theta$ is 67.5 degrees so that the aberration of direction is 0.69. When the difference is 4, $\theta$ is 90 degrees so that the aberration of direction is 0.5.

The total dispersion RE with respect to the block H is calculated from the above formula (1), using the aberration of direction (dispersion between classes) obtained above, and the dispersion within a class, Vm and Vs. This total dispersion RE changes between 0 and 1. The more identical the sample and the master images are, the more the value of the total dispersion approaches 1. For example, when the sample image and the master image are almost identical with one another, the value of total dispersion RE with respect to the block H becomes more than 0.8. Contrary to the above, when the sample image and the master image are not identical, the value of the total dispersion RE with respect to the block H becomes less than 0.7.

Next, the crosscorrelation is calculated with respect to the block H.

First the crosscorrelations, as with the total dispersion, are calculated for each area from a to p. Then a mean value of the calculated crosscorrelations is determined as the crosscorrelation of corresponding block H. The crosscorrelation changes between 0 and 1. The more identical the sample and the master images are, the more the value of the crosscorrelation approaches 1.

Then, the distance between classes is calculated with respect to the block H.

First this distance between classes, as with the crosscorrelation, are calculated for each area from a to p. Then a mean value of the calculated distances between classes is determined as the distance between classes of corresponding block H.

Accordingly, the total dispersion, the crosscorrelation and the distance between classes of the block H are calculated with respect to both master and sample images, which include the center of characteristics. In order to judge whether or not the master image and the sample image coincide with each other, it is necessary to have a total dispersion of more than 0.7, a crosscorrelation of more than 0.96 and a distance between classes of less than 0.1.

Hereinafter, two other embodiments according to the present invention are described. First, according to FIG. 1, it is possible to perform fingerprint verification using data of not only the block H, which includes the center of characteristics, but also blocks adjacent to the block H (for example, 1 or more than 1 block from D, E, F, G, I, J, K and L).

Figure 11:
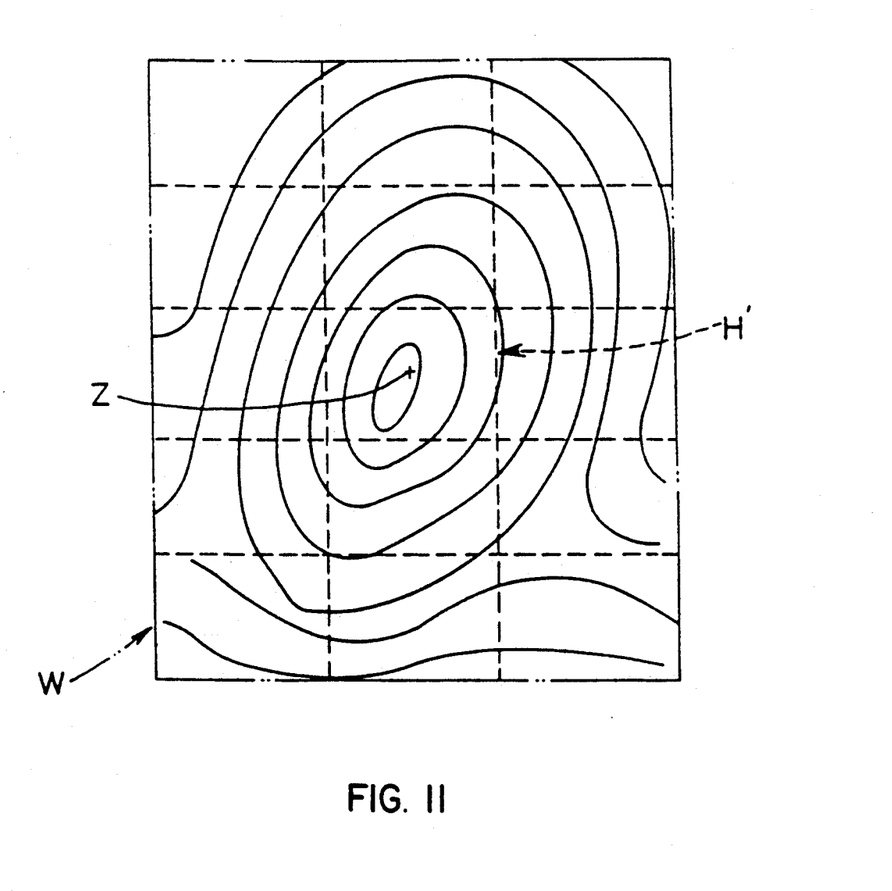
FIG. 11 shows a diagram indicating a fillet center.

Second, according to FIG. 11, it is possible to perform fingerprint verification using only data with respect to a block H'. Here, the block H' includes the fillet center Z of the rectangle W surrounding the fingerprint image that is determined to be the center of the characteristics. Furthermore, it is possible to perform fingerprint verification using data in the block H' including the fillet center and in adjacent blocks to the block H'.

For fingerprint verification, it is not necessary to use all the indices, that is, the total dispersion, the crosscorrelation, and the distance between classes. The comparison between images can be performed by using one or two indices from the above.

As mentioned above, it is possible to realize accurate fingerprint verification using a small volume of data.

As mentioned above, it is possible to greatly simplify the steps of generating a master image and a sample image used for fingerprint verification, as well as realizing accurate fingerprint verification within a short period of time.

I claim:

1. A method for verifying that a sample image of a fingerprint is that of a designated person through comparison of sample data, generated from the sample image, with master data, generated from a master image of the designated person's fingerprint, the master and sample image having been divided into a plurality of blocks and each block having been divided into a plurality of block areas, each block area is comprised of pixels each having an associated direction as the sample and master data, the method comprising the steps of:

determining a cross-correlation between the block areas of each block in the sample image and the master image based on a number of pixels in each block area of the sample image and master image associated with a direction which represents a similarity in directions associated with the pixels in a block area;

calculating a mean of the cross-correlations between the block areas for each block of the sample and master image to determine a cross-correlation between each block of the sample and master image;

comparing the cross-correlations between each block of the sample and master image to a reference cross-correlation; and verifying a fingerprint as that of the designated person based on results from the comparisons.

2. A method for verifying that a sample image of a fingerprint is that of a designated person through comparison of sample data, generated from the sample image, with master data, generated from a master image of the designated person's fingerprint, the master and sample image having been divided into a plurality of blocks and each block having been divided into a plurality of block areas, each block area is comprised of pixels each having an associated direction as the sample and master data, the method comprising the steps of:

determining a distance between classes between the block areas of each block in the sample image and the master image based on a number of pixels in each block area of the sample image and mater image associated with a direction which represents a difference in directions associated with the pixels in a block area;

calculating a mean of the distance between classes between the block areas for each block of the sample and master data to determine a distance between classes between each block of the sample and master data;

comparing the distance between classes between each block of the sample and master data to a reference distance between classes; and verifying a fingerprint as that of the designated person based on results from the comparisons.

3. A method for verifying that a sample image of a fingerprint is that of a designated person through comparison of sample data, generated from the sample image, with master data, generated from a master image of the designated person's fingerprint, the master and sample image having been divided into a plurality of blocks and each block having been divided into a plurality of block areas, each block area is comprised of pixels each having an associated direction as the sample and master data, the method comprising the steps of:

determining a cross-correlation between the block areas of each block in the sample image and the master image based on a number of pixels in each block area of the sample image and master image associated with a direction which represents a similarity in directions associated with the pixels in a block area;

calculating a mean of the cross-correlations between the block areas for each block of the sample and master image to determine a cross-correlation between each block of the sample and master image;

determining a distance between classes between the block areas of each block in the sample image and the master image based on a number of pixels in each block area of the sample image and master image associated with a direction which represents a difference in directions associated with the pixels in a block area;

calculating a mean of the distance between classes between the block areas for each block of the sample and master data to determine a distance between classes between each block of the sample and master data;

first comparing the distance between classes between each block of the sample and master data to a reference distance between classes;

second comparing the cross-correlations between each block of the sample and master image to a reference cross-correlation;

verifying a fingerprint as that of the designated person based on results from the first and second comparisons.

* * * * *